No. 726,670. PATENTED APR. 28, 1903.
O. E. GEISEL.
METHOD OF JOINING THE ENDS OF WOVEN BELTS.
APPLICATION FILED NOV. 1, 1902.
NO MODEL.
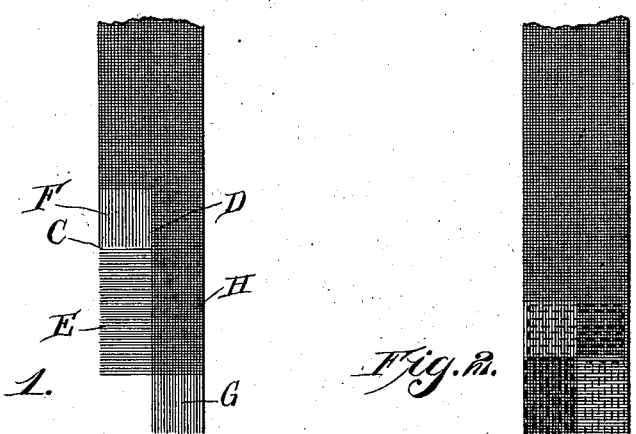
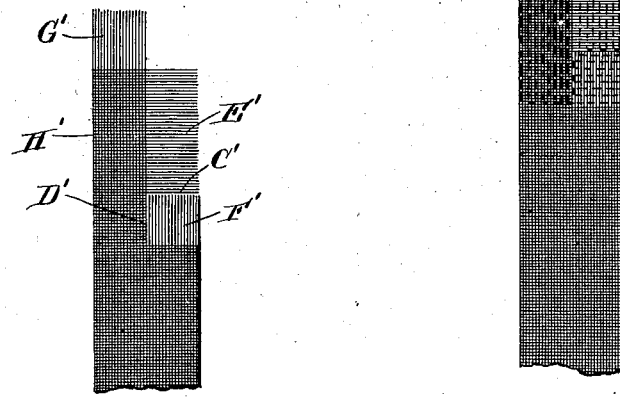
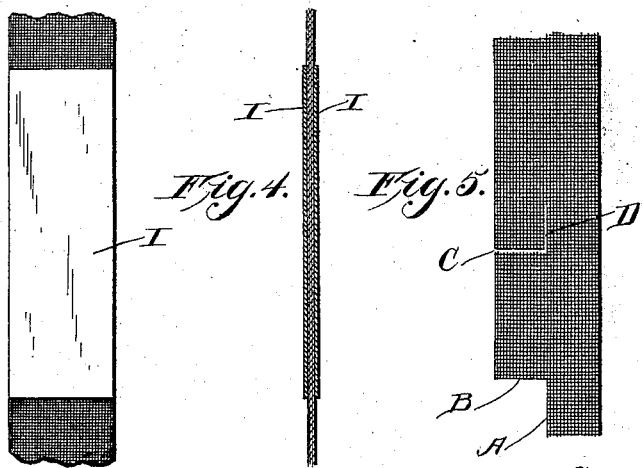
Witnesses
Louis D. Heinrichs
L. H. Morrison
Inventor
Otto E. Geisel
By his Attorney

UNITED STATES PATENT OFFICE.

OTTO E. GEISEL, OF PHILADELPHIA, PENNSYLVANIA.

METHOD OF JOINING THE ENDS OF WOVEN BELTS.

SPECIFICATION forming part of Letters Patent No. 726,670, dated April 28, 1903.

Application filed November 1, 1902. Serial No. 129,651. (No specimens.)

*To all whom it may concern:*

Be it known that I, OTTO E. GEISEL, a subject of the Emperor of Germany, residing at Philadelphia, county of Philadelphia, and State of Pennsylvania, have invented a certain new and useful Improvement in Methods of Joining the Ends of Woven Belts, of which the following is a specification.

My invention relates to a new and useful improvement in methods for joining the ends of woven belts, and has for its object to provide a method whereby the ends of a woven belt may be joined together strongly and still not materially increase the thickness at the joint.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 represents the two ends of a belt prepared for joining. Fig. 2 shows the two ends joined and stitched. Fig. 3 represents the joint covered with rubber. Fig. 4 is a longitudinal section through the joint. Fig. 5 is a view of one end of the belt before the threads are pulled out, showing how the belt is cut.

In high-speed machinery, such as routing-machines and the like, where belting is used to transmit the power from a large wheel to a very small pulley, an exceeding flexible belt is required, and therefore it has been found by experiment that a web or woven belt answers the requirements; but it has always been a difficult problem to join the two ends of the belt so as to withstand the high speed at which it is caused to travel. Of course the two ends of the belt could be overlapped and stitched together; but this would cause a double thickness at the joint, which would be a detriment to the belt.

My method consists in preparing the two ends of the belt to be joined as follows: Each end of the belt is slit, as indicated at A, from the end a short distance into the belt and in the middle thereof. Then a cross-slit B is made from one side into the belt until it meets the slit A, thus removing one corner. Then a cross-slit C is made in the belt from the same side as the slit B, and then in the middle of the belt a longitudinal slit D is cut from the slit C a short distance into the belt away from the end. Then the longitudinal threads between the slits C and B are removed, leaving the cross-threads exposed, as represented. Then the cross-threads are removed from that portion of the belt inclosed on two sides by the slits D and C, thus leaving the longitudinal threads exposed, as indicated at F. Then the cross-threads are removed from the end of the belt between the removed section and the side, leaving the longitudinal threads exposed, as indicated at G. The other end of the belt is prepared in the same manner, except it is reversed, and the corresponding parts in this other end are lettered E', F', and G', respectively. In joining the two ends the shredded portion G' is passed through the slit C, so as to lie underneath the shredded portion F, and the shredded portion E' will come over the solid portion H of the opposite end of the belt, and the shredded portion E will come under the solid portion H' of the other end, and the shredded portion G will pass through the slit C' and lie above the shredded portion F'. Thus there will not be any portion of the joint where two solid portions of the belt come against one another, and in this way the thickness at the joint will not be materially increased. After the two ends are placed in this position the joint is coated with cement or like substance, and then it is stitched through and through, as illustrated in Fig. 2. The belt is then joined strongly and its flexibility has not been damaged to any great extent.

To protect the joint and stitches, a thin coating of rubber I is vulcanized upon each side of the joint, as illustrated in Figs. 3 and 4, and this will protect the stitches from being worn in traveling around the pulleys.

Of course the two ends of the belt could be laid one over the other, if desired, without passing the portion G and G' through the slits C and C', but by doing it in the manner described a stronger joint is formed.

I am aware that web belts have been joined before by shredding a portion of each end of the belt; but a joint has never been made whereby portions of the belt were shredded so as to leave longitudinal threads and the portions threaded so as to leave cross-threads and so shredded that no two solid portions would come together at the joint.

Of course I do not wish to be limited to the exact manner of shredding the ends as here shown, as slight modifications could be made without departing from the spirit of the invention.

Having thus fully described my invention, what I claim as new and useful is—

1. The herein-described method of joining the ends of web belting consisting of shredding the ends so as to remove the longitudinal threads from one portion and the cross-threads from other portions, the shredded portions being reverse on each end, then placing the ends together so that no two solid portions will overlap one another, then coating the joint with cement or like material, then stitching the joint through and through, substantially as and for the purpose specified.

2. The herein-described method of joining the ends of web belting consisting of shredding the ends so as to remove the longitudinal threads from one portion and the cross-threads from other portions, the shredded portions being reverse on each end, then placing the ends together so that no two solid portions will overlap one another, then coating the joint with cement or like material, then stitching the joint through and through, then covering the joint upon each side with a thin coating of rubber vulcanized to the web, substantially as described and for the purpose specified.

3. The method of joining the ends of woven belts, consisting in slitting the belt in from one side to the middle at a short distance from the end, then slitting the belt from the end in the middle until it meets the cross-strip, thus removing one corner, then shredding away the cross-threads between these cut-away portions and the other side so as to leave the longitudinal threads exposed, then slitting the belt in from the side to the middle at a distance beyond the first side slit, then shredding away the longitudinal threads in between the cut-away portion on the end and the last-named slit so as to leave the cross-threads exposed, then slitting the belt longitudinally inward in the center of the belt from the last cross-slit, then removing the cross-threads in between this longitudinal slit and the side so as to leave the longitudinal threads exposed, then preparing the opposite end of the web in the same manner but reverse, and then joining the two ends so that the longitudinally-exposed threads upon each end will be passed through the cross-slit, then coating the joint with cement or the like, then stitching the joint through and through in a number of places, then coating each side of the joint with a thin coating of rubber vulcanized to the belt, substantially as and for the purpose specified.

In testimony whereof I have hereunto affixed my signature in the presence of two subscribing witnesses.

OTTO E. GEISEL.

Witnesses:
H. B. HALLOCK,
L. W. MORRISON.